United States Patent
Xue et al.

(10) Patent No.: US 9,992,706 B2
(45) Date of Patent: Jun. 5, 2018

(54) HQOS CONTROL METHOD, RSG AND HQOS CONTROL SYSTEM

(71) Applicant: Huawei Technologies Co., Ltd., Shenzhen (CN)

(72) Inventors: Huan Xue, Beijing (CN); Wenwu Zhang, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 254 days.

(21) Appl. No.: 14/871,211

(22) Filed: Sep. 30, 2015

(65) Prior Publication Data

US 2016/0021576 A1 Jan. 21, 2016

Related U.S. Application Data

(63) Continuation of application No. PCT/CN2013/088717, filed on Dec. 6, 2013.

(30) Foreign Application Priority Data

Apr. 8, 2013 (CN) .......................... 2013 1 0119494

(51) Int. Cl.
*H04W 28/24* (2009.01)
*H04W 12/06* (2009.01)
(Continued)

(52) U.S. Cl.
CPC ........... *H04W 28/24* (2013.01); *H04L 61/203* (2013.01); *H04W 12/06* (2013.01); *H04W 12/08* (2013.01);
(Continued)

(58) Field of Classification Search
CPC ..... H04W 24/10; H04W 28/20; H04W 28/24; H04W 88/08; H04W 88/16
See application file for complete search history.

(56) References Cited

U.S. PATENT DOCUMENTS

2010/0293293 A1\* 11/2010 Beser ................... H04L 45/00 709/238
2012/0082073 A1\* 4/2012 Andreasen .......... H04L 12/4633 370/310
(Continued)

FOREIGN PATENT DOCUMENTS

| CN | 101710877 A | 5/2010 |
| CN | 102244863 A | 11/2011 |

(Continued)

OTHER PUBLICATIONS

Li, Z. et al., "OSPF Extensions for Automatic Computation of MPLS Traffic Engineering Path Using Traffic Engineering Layers and Areas draft-li-ospf-auto-mbb-te-path-00," Network Working Group, Internet-Draft, Intended Status: Experimental, Expires: Aug. 22, 2013, Feb. 18, 2013, 14 pages.

(Continued)

*Primary Examiner* — Sulaiman Nooristany
(74) *Attorney, Agent, or Firm* — Slater Matsil, LLP

(57) ABSTRACT

The present application provides an HQoS control method, where the RSG is connected to multiple CSGs, and each CSG of the CSGs is connected to multiple base stations. The RSG configures a bandwidth limitation parameter for each CSG; creates different AAA domains for different IP address network segments, and configures a QoS scheduling parameter in each AAA domain; and determines, according to a configuration parameter of a first base station, a bandwidth limitation parameter of a CSG connected to the first base station, and determines a QoS scheduling parameter of the first base station, where the configuration parameter is used to indicate the CSG connected to the first base station and an AAA domain corresponding to the first base station. The present application greatly migrates a risk from excessively concentrated base station gateways, and ensures that a (Continued)

service packet securely traverses a layer 2 tunnel of a fixed network operator.

18 Claims, 5 Drawing Sheets

(51) Int. Cl.
   *H04W 12/08* (2009.01)
   *H04L 29/12* (2006.01)
   *H04W 24/10* (2009.01)
   *H04W 28/20* (2009.01)
   *H04W 88/08* (2009.01)
   *H04W 88/16* (2009.01)

(52) U.S. Cl.
   CPC ........... *H04W 24/10* (2013.01); *H04W 28/20* (2013.01); *H04W 88/08* (2013.01); *H04W 88/16* (2013.01)

(56) References Cited

U.S. PATENT DOCUMENTS

| | | |
|---|---|---|
| 2012/0236730 A1 | 9/2012 | Zhou et al. |
| 2013/0058256 A1* | 3/2013 | Li .................. H04L 61/2517 370/255 |
| 2015/0200828 A1 | 7/2015 | Liu et al. |

FOREIGN PATENT DOCUMENTS

| | | | |
|---|---|---|---|
| CN | 102946330 A | 2/2013 | |
| CN | 103249091 | 8/2013 | |
| EP | 2434803 A1 * | 3/2012 | ........... H04L 47/782 |

OTHER PUBLICATIONS

Cao, Q., "The Value of SDN to Operators," (Partial Translation), Telecommunications Network Technology Journal, Issue 3, 2013, 6 pages.

* cited by examiner

HQOS CONTROL METHOD, RSG AND HQOS CONTROL SYSTEM

This application is a continuation of International Application No. PCT/CN2013/088717, filed on Dec. 6, 2013, which claims priority to Chinese Patent Application No. 201310119494.0, filed on Apr. 8, 2013, both of which are hereby incorporated by reference in their entireties.

TECHNICAL FIELD

The present application relates to the field of communications, and in particular, to a hierarchical quality of service (HQoS) control method, a radio network controller site gateway (RSG), and an HQoS control system.

BACKGROUND

With continuous development of various application technologies, users are increasingly depending on services provided on an IP network: enterprise users expect that an Internet Protocol (IP) network can provide secure and reliable services such as a private line service, a voice over Internet protocol (VOIP) service, and a video conference service, so as to save operating expenses of enterprises; and individual users also expect to gain better multimedia experience from the IP network, including services such as a high-quality IP television service, a video chat service, and a real-time gaming service. In addition, with large-scale deployment of a next generation network (NGN)/third generation mobile telecommunications technologies (3rd-generation, 3G), a broadband access network is required for bearing an NGN/3G service, so as to reduce costs of the entire network solutions. All the foregoing cases require that the broadband access network has a quality of service (QoS) processing capability to bear services of different QoS requirements.

Generally, a typical broadband access network is a layer 2 network. In a downlink direction of the layer 2 network, because traffic in a high-speed line is forwarded to a low-speed line, if QoS processing is not performed, congestion may occur, and consequently, QoS of a borne service cannot be ensured. If a broadband remote access server (BRAS) is capable of predicating, according to a forwarding path of a packet and a bearing capability of all links from the BRAS to a terminal, whether congestion occurs during forwarding of the packet over the broadband access network, and taking corresponding measures, occurrence of the congestion can be avoided. A link from the BRAS to the terminal traverses devices such as the BRAS, a local area network switch (LAN Switch), a digital subscriber line access multiplexer (DSLAM), customer premise equipment (CPE), and the terminal, and a link rate gradually decreases. Therefore, there is a hierarchical QoS processing process, that is, an HQoS process.

During construction of a mobile IP backhaul network, generally, a mobile operator does not have optical fiber transmission resources, and therefore, needs to lease transmission resources of a fixed network operator to connect a base station and a base station controller. In the foregoing application scenario, the fixed network operator promises to provide a layer 2 tunnel with a certain rate for the mobile operator, while a packet exceeding the rate will be discarded. To ensure that a data packet of the mobile operator is not discarded by the fixed network operator, the mobile operator needs to perform predictable HQoS processing to ensure that a rate of a packet reaching the layer 2 tunnel of the fixed network operator is less than a committed rate of the layer 2 tunnel.

However, at present, risks are relatively concentrated during an HQoS control process.

SUMMARY

An objective of embodiments of the present application is to provide an HQoS control method, an RSG, and an HQoS control system, and solve a problem that risks are relatively concentrated when the existing HQoS technologies are applied to a mobile IP backhaul network.

According to a first aspect, an HQoS control method is provided, and the method includes: where an RSG is connected to multiple CSGs, and each CSG of the CSGs is connected to multiple base stations, configuring, by the RSG, a bandwidth limitation parameter for each CSG of the CSGs; creating, by the RSG, different AAA domains for different IP address network segments, and configuring a QoS scheduling parameter in each AAA domain; and determining, by the RSG according to a configuration parameter of a first base station, a bandwidth limitation parameter of a CSG connected to the first base station, and determining a QoS scheduling parameter of the first base station, where the configuration parameter is used to indicate the CSG connected to the first base station, and is used to indicate an AAA domain corresponding to the first base station, and the first base station is one of the multiple base stations that initiate service requests.

In a first possible implementation manner of the first aspect, the RSG and the CSGs are connected through subinterfaces or physical interfaces; and the configuring, by the RSG, a bandwidth limitation parameter for each of the CSGs includes: creating, by the RSG, a group queue GQ template for each of the CSGs; configuring, by the RSG, the bandwidth limitation parameter for a corresponding CSG in the GQ template; and binding, by the RSG, the GQ template to a subinterface or a physical interface of the corresponding CSG.

In a second possible implementation manner of the first aspect, the creating, by the RSG, different AAA domains for different IP address network segments, and configuring a QoS scheduling parameter in each AAA domain includes: acquiring, by the RSG, IP address network segments to which the multiple base stations belong; creating, by the RSG, the corresponding AAA domains for the different IP address network segments; and configuring, by the RSG, in each AAA domain, the QoS scheduling parameter for a base station in an IP address network segment corresponding to the AAA domain.

With reference to the first aspect or the first possible implementation manner of the first aspect or the second possible implementation manner of the first aspect, in a third possible implementation manner, the determining, by the RSG according to a configuration parameter of a first base station, a bandwidth limitation parameter of a CSG connected to the first base station, and determining a QoS scheduling parameter of the first base station includes: intercepting, by the RSG, a request packet sent by the first base station to a Dynamic Host Configuration Protocol DHCP server, and extracting the configuration parameter of the first base station from the request packet, where the configuration parameter includes an equipment identifier of the CSG connected to the first base station, and an IP address and an Option60 attribute of the first base station; intercepting, by the RSG, a reply packet returned by the DHCP server to the first base station, and determining whether an IP address carried in the reply packet matches the IP address of the first base station; and when the IP address carried in the reply packet matches the IP address of the first base station, determining, by the RSG according to the equipment identifier, the bandwidth limitation parameter of the CSG connected to the first base station, and determining, according to an AAA domain specified in the Option60 attribute, the QoS scheduling parameter of the first base station.

With reference to the third possible implementation manner of the first aspect, in a fourth possible implementation manner, the equipment identifier includes an identifier of an interface between the CSG connected to the first base station and the RSG.

According to a second aspect, an RSG is provided, where the RSG is connected to multiple CSGs, each CSG of the CSGs is connected to multiple base stations, and the RSG includes: a first configuring unit, adapted to configure a bandwidth limitation parameter for each CSG of the CSGs; a second configuring unit, configured to create different AAA domains for different IP address network segments, and configure a QoS scheduling parameter in each AAA domain; and an HQoS controlling unit, configured to, according to the bandwidth limitation parameter which is configured by the first configuring unit for each of the CSGs, and the QoS scheduling parameter which is configured by the second configuring unit in each AAA domain, and according to a configuration parameter of a first base station, determine a bandwidth limitation parameter of a CSG connected to the first base station, and determine a QoS scheduling parameter of the first base station, where the configuration parameter is used to indicate the CSG connected to the first base station, and is used to indicate an AAA domain corresponding to the first base station, and the first base station is one of the multiple base stations that initiate service requests.

In a first possible implementation manner of the second aspect, the RSG and the CSGs are connected through subinterfaces or physical interfaces, and the first configuring unit is specifically configured to: create a group queue GQ template for each of the CSGs; configure the bandwidth limitation parameter for a corresponding CSG in the GQ template; and bind the GQ template to a subinterface or a physical interface of the corresponding CSG.

In a second possible implementation manner of the second aspect, the second configuring unit is specifically configured to: acquire IP address network segments to which the multiple base stations belong; create the corresponding AAA domains for the different IP address network segments; and configure, in each AAA domain, the QoS scheduling parameter for a base station in an IP address network segment corresponding to the AAA domain.

With reference to the second aspect or the first possible implementation manner of the second aspect or the second possible implementation manner of the second aspect, in a third possible implementation manner, the HQoS controlling unit is specifically configured to: intercept a request packet sent by the first base station to a Dynamic Host Configuration Protocol DHCP server, and extract the configuration parameter of the first base station from the request packet, where the configuration parameter includes an equipment identifier of the CSG connected to the first base station, and an IP address and an Option60 attribute of the first base station; intercept a reply packet returned by the DHCP server to the first base station, and determine whether an IP address carried in the reply packet matches the IP address of the first base station; and when the IP address carried in the reply packet matches the IP address of the first base station, determine, according to the equipment identifier, the bandwidth limitation parameter of the CSG connected to the first base station, and determine, according to an AAA domain specified in the Option60 attribute, the QoS scheduling parameter of the first base station.

With reference to the third possible implementation manner of the second aspect, in a fourth possible implementation manner, the equipment identifier includes an identifier of an interface between the CSG connected to the first base station and the RSG.

According to a third aspect, an HQoS control system is provided, including an RSG, CSGs, and base stations, where the RSG is connected to a plurality of the CSGs, each CSG of the CSGs is connected to multiple base stations, and the RSG includes: a first configuring unit, adapted to configure a bandwidth limitation parameter for each CSG of the CSGs; a second configuring unit, configured to create different authentication, authorization and accounting AAA domains for different IP address network segments, and configure a QoS scheduling parameter in each AAA domain; and an HQoS controlling unit, configured to, according to the bandwidth limitation parameter which is configured by the first configuring unit for each of the CSGs, and the QoS scheduling parameter which is configured by the second configuring unit in each AAA domain, and according to a configuration parameter of a first base station, determine a bandwidth limitation parameter of a CSG connected to the first base station, and determine a QoS scheduling parameter of the first base station, where the configuration parameter is used to indicate the CSG connected to the first base station, and is used to indicate an AAA domain corresponding to the first base station, and the first base station is one of the multiple base stations that initiate service requests.

In a first possible implementation manner of the third aspect, the RSG and the CSGs are connected through subinterfaces or physical interfaces, and the first configuring unit is specifically configured to: create a group queue GQ template for each of the CSGs; configure the bandwidth limitation parameter for a corresponding CSG in the GQ template; and bind the GQ template to a subinterface or a physical interface of the corresponding CSG.

In a second possible implementation manner of the third aspect, the second configuring unit is specifically configured to: acquire IP address network segments to which the multiple base stations belong; create the corresponding AAA domains for the different IP address network segments; and configure, in each AAA domain, the QoS scheduling parameter for a base station in an IP address network segment corresponding to the AAA domain.

With reference to the third aspect or the first possible implementation manner of the third aspect or the second possible implementation manner of the third aspect, in a third possible implementation manner, the HQoS controlling unit is specifically configured to: intercept a request packet sent by the first base station to a Dynamic Host Configuration Protocol DHCP server, and extract the configuration parameter of the first base station from the request packet, where the configuration parameter includes an equipment identifier of the CSG connected to the first base station, and an IP address and an Option60 attribute of the first base station; intercept a reply packet returned by the DHCP server to the first base station, and determine whether an IP address carried in the reply packet matches the IP address of the first base station; and when the IP address carried in the reply packet matches the IP address of the first base station, determine, according to the equipment identifier, the bandwidth limitation parameter of the CSG connected to the first base station, and determine, according to an AAA domain specified in the Option60 attribute, the QoS scheduling parameter of the first base station.

With reference to the third possible implementation manner of the third aspect, in a fourth possible implementation manner, the equipment identifier includes an identifier of an interface between the CSG connected to the first base station and the RSG.

In the embodiments of the present application, a CSG is added between a base station and an RSG, and the CSG is used as a new gateway of the base station; the RSG sets a GQ for each CSG and sets an SQ for each base station; and the RSG preconfigures a QoS policy for each CSG and a QoS policy for each base station, thereby implementing HQoS control during a service request process of the base station. Because a position of a base station gateway on a network is moved down, a risk from excessively concentrated base station gateways is greatly migrated, and it is effectively ensured that a service packet securely traverses a layer 2 tunnel of a fixed network operator.

DETAILED DESCRIPTION OF ILLUSTRATIVE EMBODIMENTS

To make the objectives, technical solutions, and advantages of the present application clearer and more comprehensible, the following further describes the present application in detail with reference to the accompanying drawings and embodiments. It should be understood that the specific embodiments described herein are merely used to explain the present application but are not intended to limit the present application.

In embodiments of the present application, a cell site gateway (CSG) is added between a base station and an RSG, and the CSG is used as a new gateway of the base station; the RSG sets a group queue (GQ) for each CSG, and sets a subscriber queue (SQ) for each base station; and the RSG preconfigures a QoS policy for each CSG and a QoS policy for each base station, thereby implementing HQoS control during a service request process of the base station. Because a position of a base station gateway on a network is moved down, a risk from excessively concentrated base station gateways is greatly migrated, and it is effectively ensured that a service packet securely traverses a layer 2 tunnel of a fixed network operator.

It should be noted that, the embodiments of the present application only involves a case of a downlink direction. In a case of an uplink direction, because traffic in a low-speed line is aggregated to a high-speed line, in a situation without traffic convergence, no congestion occurs, and a problem of QoS processing does not need to be considered; while in a situation of traffic convergence, simple scheduling based on priority or by using a weighted round robin (WRR) algorithm may be performed on each node to ensure QoS of a service.

Figure 1:
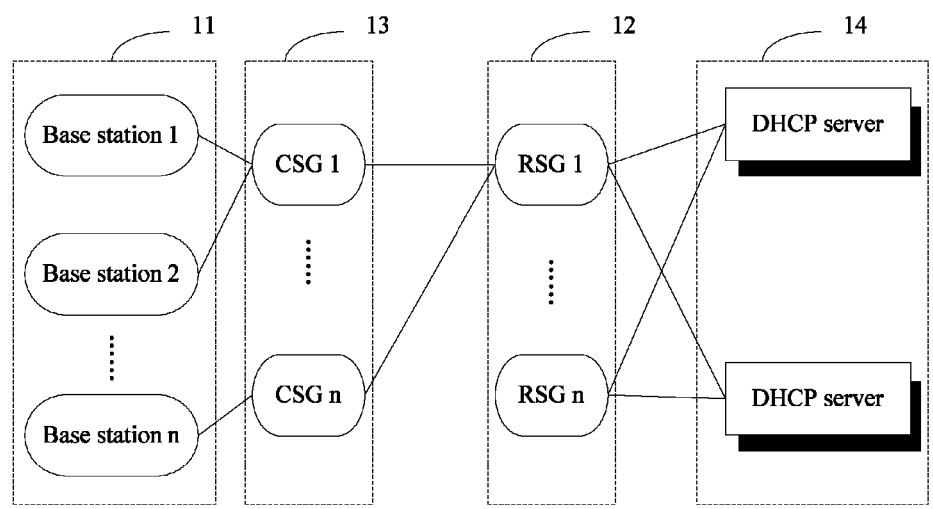
FIG. 1 is a structural block diagram of an HQoS control system according to an embodiment of the present application.

FIG. 1 is a structural block diagram of an HQoS system according to an embodiment of the present application. For ease of description, only parts related to the embodiment are shown.

As may be seen from FIG. 1, in the embodiment, by adding multiple CSGs 13 between base stations 11 and RSGs 12 (third-party network nodes) to serve as new gateways of the base station, moving-down of the base station gateways is implemented. In an HQoS system shown in FIG. 1, each RSG 12 is connected to multiple CSGs 13, and each CSG 13 is further connected to multiple base stations 11. Because the CSGs 13 and the RSGs 12 are separately located at different layers of a two-layer network, IP addresses belonging to a same network segment are configured for the CSGs 13 and the RSGs 12, so that the CSGs 13 and the RSGs 12 can communication with each other by using the IP addresses in the same network segment. The CSGs 13 and the RSGs 12, serving as Dynamic Host Configuration Protocol (DHCP) relays, also help the base stations 11 to acquire IP addresses from a DHCP server 14.

It may be seen from the foregoing system architecture, compared with a solution that an RSG allocates an SQ for each base station and allocates a GQ for multiple base stations, in the embodiment, because a CSG is added between an RSG and a base station, for the RSG, an SQ may be set for each base station, and a GQ may be set for each CSG, so as to perform QoS control.

Figure 2:
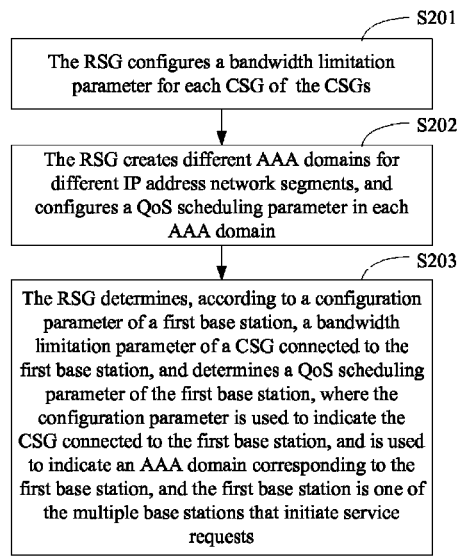
FIG. 2 is an implementation flowchart of an HQoS control method according to an embodiment of the present application.

Next, based on the system architecture shown in FIG. 1, an HQoS control method according to the embodiment of the present application is described in detail:

FIG. 2 is an implementation procedure of an HQoS control method according to an embodiment of the present application, which is described in detail as follows:

In S201, an RSG configures a bandwidth limitation parameter for each CSG.

Figure 3:
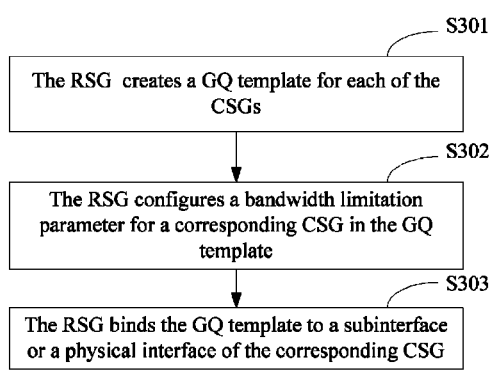
FIG. 3 is a specific implementation flowchart of an HQoS control method S201 according to an embodiment of the present application.

Specifically, one RSG is connected to one CSG through subinterfaces or physical interfaces. As shown in FIG. 3, S201 is specifically:

In S301, the RSG creates a GQ template for each of the CSGs.

In the embodiment, for each CSG connected to the RSG, the RSG creates corresponding GQ template, and base stations connected to each CSG form one GQ.

In S302, the RSG configures the bandwidth limitation parameter for a corresponding CSG in the GQ template.

For each CSG connected to the RSG, the RSG configures a bandwidth limitation parameter for the CSG in a corresponding GQ template, where the bandwidth limitation parameter is a bandwidth limitation parameter configured by the RSG for the GQ that is connected to the CSG and includes multiple base stations.

In S303, the RSG binds the GQ template to a subinterface or a physical interface of the corresponding CSG.

The RSG binds the GQ template in which the bandwidth limitation parameter is configured to the subinterface or the physical interface of the CSG corresponding to the GQ template. Then, preconfiguration of a QoS policy for each GQ is completed.

In S202, the RSG creates corresponding authentication, authorization and accounting (AAA) domains for different IP address network segments, and configures a QoS scheduling parameter in each AAA domain.

Figure 4:
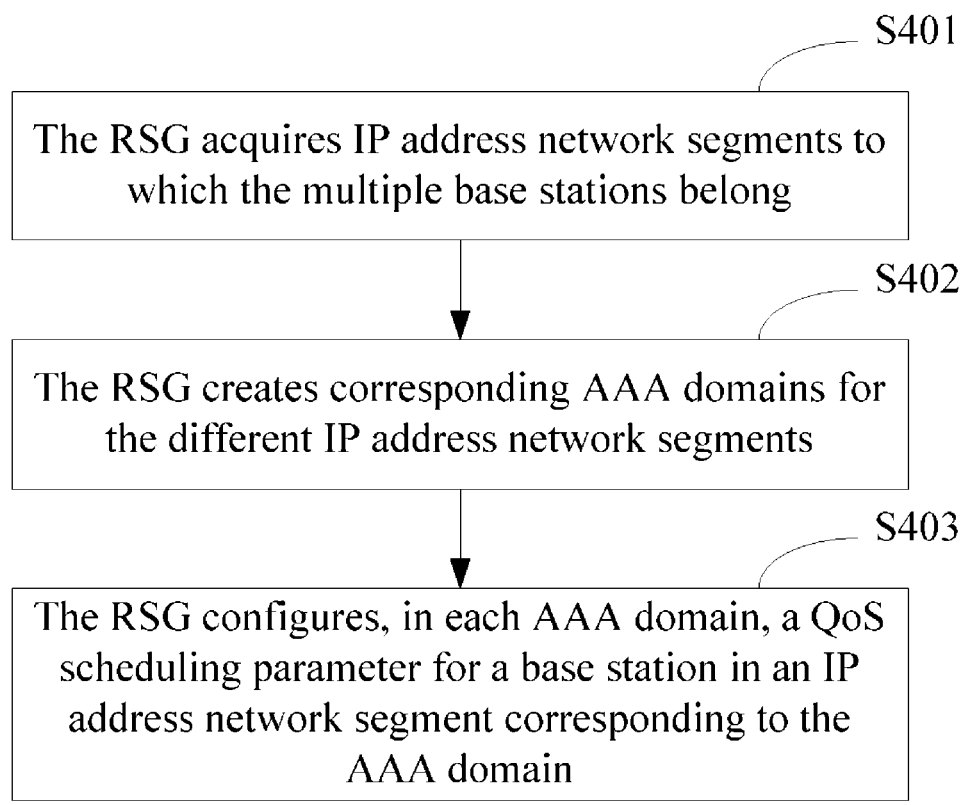
FIG. 4 is a specific implementation flowchart of an HQoS control method S202 according to an embodiment of the present application.

As shown in FIG. 4, S202 is specifically:

In S401, the RSG acquires IP address network segments to which the multiple base stations belong.

For access of all base stations of the CSG connected to the RSG, the RSG acquires the IP address network segments to which these base stations belong.

In S402, the RSG creates corresponding AAA domains for the different IP address network segments to which these base stations belong.

Specifically, one corresponding AAA domain may be created for each IP address network segment, or one corresponding AAA domain may be created for several IP address network segments.

In S403, the RSG configures, in each AAA domain, a QoS scheduling parameter for a base station in an IP address network segment corresponding to the AAA domain.

In the embodiment, the RSG configures, in each AAA domain, the QoS scheduling parameter for the base station in the IP address network segment corresponding to the AAA domain. Then, preconfiguration of a QoS policy for each SQ is implemented.

In S203, the RSG determines, according to a configuration parameter of a first base station, a bandwidth limitation parameter of a CSG connected to the first base station, and determines a QoS scheduling parameter of the first base station, where the configuration parameter of the first base station is used to indicate the CSG connected to the first base station, and is used to indicate an AAA domain corresponding to the first base station, and the first base station is a base station that initiates a service request.

Figure 5:
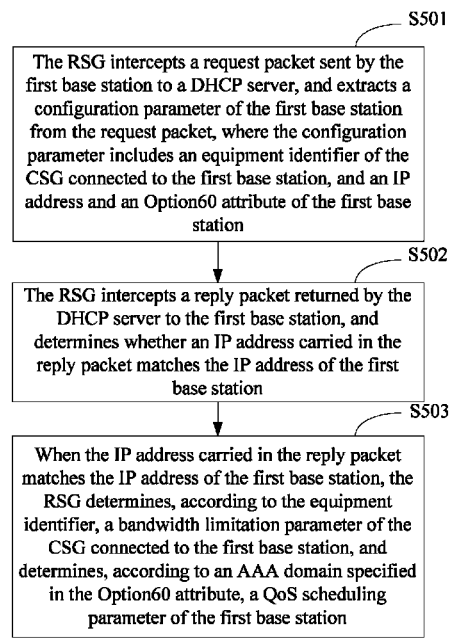
FIG. 5 is a specific implementation flowchart of an HQoS control method S203 according to an embodiment of the present application.

As shown in FIG. 5, S203 is specifically:

In S501, the RSG intercepts a request packet sent by the first base station to a Dynamic Host Configuration Protocol DHCP server, and extracts a configuration parameter of the first base station from the request packet, where the configuration parameter includes an equipment identifier of a CSG connected to the first base station, and an IP address and an Option60 attribute of the first base station.

In the embodiment, when the first base station initiates the service request to the DHCP server, the RSG extracts, by intercepting the request packet sent by the first base station to the DHCP server, the configuration parameter of the first base station carried in the request packet, where the configuration parameter includes but is not limited to the equipment identifier of the CSG connected to the first base station, the IP address of the first base station, and the Option60 attribute of the first base station.

In the foregoing configuration parameter, the equipment identifier is used to indicate the CSG connected to the first base station, that is, the equipment identifier is used to indicate an GQ in which the first base station is located. Optionally, the equipment identifier of the CSG connected to the first base station may be an identifier of an interface, through which the CSG is connected to the RSG, and is used to identify subinterfaces or physical interfaces between the CSG and the RSG. The Option60 attribute of the foregoing configuration parameter is used to specify an AAA domain to which the first base station belongs.

It should be noted that, in the embodiment, to use the Option60 attribute, it is required that the base station should have a function of setting the Option60 attribute, or it is required that the CSG should be capable of setting the Option60 attribute of the base station according to an IP address network segment of the base station during implementation of a DHCP relay function.

In S502, the RSG intercepts a reply packet returned by the DHCP server to the first base station, and determines whether an IP address carried in the reply packet matches the IP address of the first base station.

In the embodiment, when the DHCP server receives the request packet from the first base station, and returns the corresponding reply packet according to the request packet, the RSG intercepts, by identifying an IP address in a Your IP address field of the reply packet, the IP address carried in the reply packet, and determines whether the IP address matches the IP address, acquired in S501, of the first base station.

In S503, when the IP address carried in the reply packet matches the IP address of the first base station, the RSG determines, according to the equipment identifier, a bandwidth limitation parameter of a CSG connected to the first base station, and determines, according to an AAA domain specified in the Option60 attribute, a QoS scheduling parameter of the first base station.

In the embodiment, when the IP address carried in the reply packet matches the IP address of the first base station that initiates the service request, which indicates that a network will deliver a QoS service to the first base station, a corresponding QoS policy is selected for the first base station from preconfigured QoS policies, so as to implement QoS control. Specifically:

the RSG determines, according to the equipment identifier, the bandwidth limitation parameter of the CSG connected to the first base station. Further, when the equipment identifier is an identifier of an interface between the CSG and the RSG, because the bandwidth limitation parameter is directly configured in a GQ template bound to the interface between the CSG and the RSG, the corresponding bandwidth limitation parameter may be determined directly according to the identifier of the interface. The RSG requests the QoS scheduling parameter of the first base station according to the AAA domain specified in the Option60 attribute.

According to the foregoing solution, when traffic of a mobile operator traverses a third-party network, because a position of a base station gateway on the network is moved down, a risk from excessively concentrated base station gateways is effectively migrated; in addition, traffic of a base station located at the network end can be effectively planned in advance, to ensure that service traffic securely traverses the third-party network; and a layer 3 HQoS control solution is deployed, which can effectively narrow down a range of affected base stations when abnormal broadcasting occurs.

Figure 6:
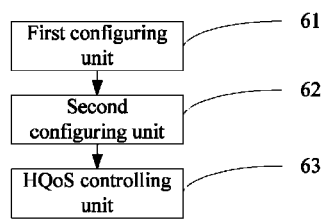
FIG. 6 is a structural block diagram of an RSG according to an embodiment of the present application.

FIG. 6 is a structural block diagram of an RSG according to an embodiment of the present application. The RSG is located in the HQoS control system shown in FIG. 1, and may be configured to execute the HQoS control methods described in the embodiments of the present application in FIG. 2 to FIG. 5. For ease of description, only parts related to the embodiment are illustrated.

In the embodiment, the RSG is connected to multiple CSGs, and each CSG is connected to multiple base stations. Referring to FIG. 6, the RSG includes:

a first configuring unit 61, adapted to configure a bandwidth limitation parameter for each CSG;

a second configuring unit 62, configured to create different AAA domains for different IP address network segments, and configure a QoS scheduling parameter in each AAA domain; and an HQoS controlling unit 63, configured to, according to the bandwidth limitation parameter which is configured by the first configuring unit 61 for each of the CSGs, and the QoS scheduling parameter which is configured by the second configuring unit 62 in each AAA domain, and according to a configuration parameter of a first base station, determine a bandwidth limitation parameter of a CSG connected to the first base station, and determine a QoS scheduling parameter of the first base station, where the configuration parameter is used to indicate the CSG connected to the first base station, and is used to indicate an AAA domain corresponding to the first base station, and the first base station is a base station that initiates a service request.

Optionally, the RSG and the CSGs are connected through subinterfaces or physical interfaces, and the first configuring unit 61 is specifically configured to:

create a group queue GQ template for each of the CSGs;

configure the bandwidth limitation parameter for a corresponding CSG in the GQ template; and bind the GQ template to a subinterface or a physical interface of the corresponding CSG.

Optionally, the second configuring unit 62 is specifically configured to:

acquire IP address network segments to which the multiple base stations belong;

create the corresponding AAA domains for the different IP address network segments; and configure, in each AAA domain, the QoS scheduling parameter for a base station in an IP address network segment corresponding to the AAA domain.

Optionally, the HQoS controlling unit 63 is specifically configured to:

intercept a request packet sent by the first base station to a Dynamic Host Configuration Protocol DHCP server, and extract the configuration parameter of the first base station from the request packet, where the configuration parameter includes an equipment identifier of the CSG connected to the first base station, and an IP address and an Option60 attribute of the first base station;

intercept a reply packet returned by the DHCP server to the first base station, and determine whether an IP address carried in the reply packet matches the IP address of the first base station; and when the IP address carried in the reply packet matches the IP address of the first base station, determine, according to the equipment identifier, the bandwidth limitation parameter of the CSG connected to the first base station, and determine, according to an AAA domain specified in the Option60 attribute, the QoS scheduling parameter of the first base station.

Optionally, the equipment identifier includes an identifier of an interface between the CSG connected to the first base station and the RSG.

Figure 7:
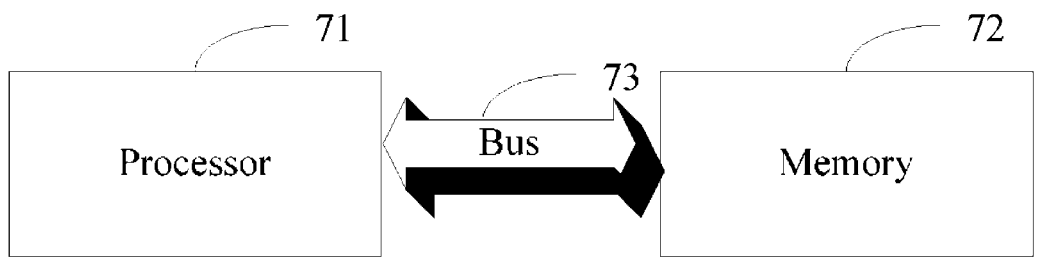
FIG. 7 is a structural block diagram of hardware of an RSG according to an embodiment of the present application.

FIG. 7 is a structural block diagram of hardware of an RSG according to an embodiment of the present application. The RSG is located in the HQoS control system shown in FIG. 1, and may be configured to execute the HQoS control methods described in the embodiments of the present application in FIG. 2 to FIG. 5. For ease of description, only parts related to the embodiment are illustrated.

In the embodiment, the RSG is connected to multiple CSGs, and each CSG is connected to multiple base stations. Referring to FIG. 7, the RSG includes a processor 71, a memory 72, and a bus 73, where the processor 71 and the memory 72 communicate with each other through the bus 73; the memory 72 is configured to store a program; and the processor 71 is configured to execute the program stored in the memory 72, where the program, when being executed, is used to:

configure a bandwidth limitation parameter for each of the CSGs;

create different AAA domains for different IP address network segments, and configure a QoS scheduling parameter in each AAA domain; and determine, according to a configuration parameter of a first base station, a bandwidth limitation parameter of a CSG connected to the first base station, and determine a QoS scheduling parameter of the first base station, where the configuration parameter is used to indicate the CSG connected to the first base station, and is used to indicate an AAA domain corresponding to the first base station, and the first base station is the base station that initiates a service request.

Optionally, the RSG and the CSGs are connected through subinterfaces or physical interfaces, and the configuring, by the RSG, a bandwidth limitation parameter for each of the CSGs includes:

creating a group queue GQ template for each of the CSGs;

configuring the bandwidth limitation parameter for a corresponding CSG in the GQ template; and binding the GQ template to a subinterface or a physical interface of the corresponding CSG.

Optionally, the creating, by the RSG, corresponding AAA domains for different IP address network segments, and configuring a QoS scheduling parameter in each AAA domain includes:

acquiring, by the RSG, an address network segments to which the multiple base stations belong;

creating, by the RSG, the corresponding AAA domains for the different IP address network segments; and configuring, by the RSG, in each AAA domain, the QoS scheduling parameter for a base station in an IP address network segment corresponding to the AAA domain.

Optionally, the determining, by the RSG according to a configuration parameter of a first base station, a bandwidth limitation parameter of a CSG connected to the first base station, and determining a QoS scheduling parameter of the first base station includes:

intercepting, by the RSG, a request packet sent by the first base station to a Dynamic Host Configuration Protocol DHCP server, and extracting the configuration parameter of the first base station from the request packet, where the configuration parameter includes an equipment identifier of the CSG connected to the first base station, and an IP address and an Option60 attribute of the first base station;

intercepting, by the RSG, a reply packet returned by the DHCP server to the first base station, and determining whether an IP address carried in the reply packet matches the IP address of the first base station; and when the IP address carried in the reply packet matches the IP address of the first base station, determining, by the RSG according to the equipment identifier, the bandwidth limitation parameter of the CSG connected to the first base station, and determining, according to an AAA domain specified in the Option60 attribute, the QoS scheduling parameter of the first base station.

Optionally, the equipment identifier includes an identifier of an interface between the CSG connected to the first base station and the RSG.

In the embodiment of the present application, a CSG is added between a base station and an RSG, and the CSG is used as a new gateway of the base station; the RSG sets a GQ for each CSG, and sets an SQ for each base station; and the RSG preconfigures a QoS policy for each CSG and a QoS policy for each base station, thereby implementing HQoS control during a service request process of the base station. Because a position of a base station gateway on a network is moved down, a risk from excessively concentrated base station gateways is greatly migrated, and it is effectively ensured that a service packet securely traverses a layer 2 tunnel of a fixed network operator.

The foregoing descriptions are merely exemplary embodiments of the present application, but are not intended to limit the present application. Any modification, equivalent replacement, or improvement made without departing from the spirit and principle of the present application should fall within the protection scope of the present application.

What is claimed is:

1. A hierarchical quality of service (HQoS) control method, wherein a radio network controller site gateway (RSG) is connected to multiple cell site gateways (CSGs), and each CSG of the CSGs is connected to multiple base stations, and the method comprises:
    configuring, by the RSG, a bandwidth limitation parameter for each CSG of the CSGs, wherein the bandwidth limitation parameter for each CSG is configured by the RSG for a group queue (GQ) that is connected to the CSG, and wherein the multiple base stations connected to the CSG form the GQ;
    creating, by the RSG, different authentication, authorization and accounting (AAA) domains for different Internet Protocol (IP) address network segments and configuring a first quality of service (QoS) scheduling parameter in each AAA domain; and
    determining, by the RSG and according to a configuration parameter of a first base station, a bandwidth limitation parameter of a CSG connected to the first base station, and determining a second QoS scheduling parameter of the first base station;
    wherein the configuration parameter is used to indicate the CSG connected to the first base station, and is further used to indicate an AAA domain corresponding to the first base station; and
    wherein the first base station is one of the multiple base stations that initiate service requests.

2. The method according to claim 1, wherein the RSG and the CSGs are connected through subinterfaces or physical interfaces; and
    wherein the configuring, by the RSG, the bandwidth limitation parameter for each of the CSGs comprises:
        creating, by the RSG, a group queue (GQ) template for each of the CSGs;
        configuring, by the RSG, the bandwidth limitation parameter for a corresponding CSG in the GQ template; and
        binding, by the RSG, the GQ template to a subinterface or a physical interface of the corresponding CSG.

3. The method according to claim 1, wherein the creating, by the RSG, corresponding AAA domains for the different IP address network segments, and configuring the first QoS scheduling parameter in each AAA domain comprises:
    acquiring, by the RSG, IP address network segments to which the multiple base stations belong;
    creating, by the RSG, the corresponding AAA domains for the different IP address network segments; and
    configuring, by the RSG, in each of the corresponding AAA domains, the second QoS scheduling parameter for a base station in an IP address network segment corresponding to the AAA domain.

4. The method according to claim 1, wherein the determining, by the RSG according to the configuration parameter of the first base station, the bandwidth limitation parameter of the CSG connected to the first base station, and determining the second QoS scheduling parameter of the first base station comprises:
    intercepting, by the RSG, a request packet sent by the first base station to a Dynamic Host Configuration Protocol (DHCP) server, and extracting the configuration parameter of the first base station from the request packet, wherein the configuration parameter comprises an equipment identifier of the CSG connected to the first base station, and an IP address and an Option60 attribute of the first base station;
    intercepting, by the RSG, a reply packet returned by the DHCP server to the first base station, and determining whether an IP address carried in the reply packet matches the IP address of the first base station; and
    determining, by the RSG, in response to the IP address carried in the reply packet matching the IP address of the first base station and according to the equipment identifier, the bandwidth limitation parameter of the CSG connected to the first base station, and determining, according to an AAA domain specified in the Option60 attribute, the second QoS scheduling parameter of the first base station.

5. The method according to claim 4, wherein the equipment identifier comprises an identifier of an interface between the CSG connected to the first base station and the RSG.

6. A radio network controller site gateway (RSG), wherein the RSG is connected to multiple cell site gateways (CSGs), each CSG of the CSGs is connected to multiple base stations, and the RSG comprises:
    a processor;
    a non-transitory computer readable medium connected to the processor and having stored therein instructions that, when executed by the processor, cause the processor to:
        configure a bandwidth limitation parameter for each CSG of the CSGs, wherein the bandwidth limitation parameter for each CSG is configured by the RSG for a group queue (GQ) that is connected to the CSG, and wherein the multiple base stations connected to the CSG form the GQ;
        create different authentication, authorization and accounting (AAA) domains for different Internet Protocol (IP) address network segments, and configure a first QoS scheduling parameter in each AAA domain; and
        determine a bandwidth limitation parameter of a CSG connected to a first base station according to the bandwidth limitation parameter configured for each of the CSGs and the first QoS scheduling parameter configured in each AAA domain, and according to a configuration parameter of a first base station, and determine a second QoS scheduling parameter of the first base station;
    wherein the configuration parameter is used to indicate the CSG connected to the first base station, and is used to indicate an AAA domain corresponding to the first base station; and wherein the first base station is one of the multiple base stations that initiate service requests.

7. The RSG according to claim 6, wherein the RSG and the CSGs are connected through subinterfaces or physical interfaces; and
wherein the instructions causing the processor to configure the bandwidth limitation parameter for each CSG of the CSGs comprise instructions that, when executed by the processor, cause the processor to:
create a group queue (GQ) template for each of the CSGs;
configure the bandwidth limitation parameter for a corresponding CSG in the GQ template; and
bind the GQ template to the subinterface or the physical interface of the corresponding CSG.

8. The RSG according to claim 6, wherein the instructions causing the processor to create the different AAA domains for the different IP address network segments, and configure the first QoS scheduling parameter in each AAA domain comprise instructions that, when executed by the processor, cause the processor to:
acquire IP address network segments to which the multiple base stations belong;
create the corresponding AAA domains for the different IP address network segments; and
configure, in each of the AAA domain, the second QoS scheduling parameter for a base station in an IP address network segment corresponding to the AAA domain.

9. The RSG according to claim 6, wherein the instructions causing the processor to determine the bandwidth limitation parameter of a CSG connected to the first base station and determine the second QoS scheduling parameter of the first base station comprise instructions that, when executed by the processor, cause the processor to:
intercept a request packet sent by the first base station to a Dynamic Host Configuration Protocol (DHCP) server, and extract the configuration parameter of the first base station from the request packet, wherein the configuration parameter comprises an equipment identifier of the CSG connected to the first base station, and an IP address and an Option60 attribute of the first base station;
intercept a reply packet returned by the DHCP server to the first base station, and determine whether an IP address carried in the reply packet matches the IP address of the first base station; and
determine, in response to the IP address carried in the reply packet matching the IP address of the first base station and according to the equipment identifier, the bandwidth limitation parameter of the CSG connected to the first base station, and determine, according to an AAA domain specified in the Option60 attribute, the second QoS scheduling parameter of the first base station.

10. The RSG according to claim 9, wherein the equipment identifier comprises an identifier of an interface between the CSG connected to the first base station and the RSG.

11. A hierarchical quality of service (HQoS) control system, comprising:
a radio network controller site gateway (RSG);
cell site gateways (CSGs); and
base stations;
wherein the RSG is connected to a plurality of the CSGs;
wherein each CSG of the CSGs is connected to multiple base stations;
wherein the RSG comprises:
a processor;
a non-transitory computer readable medium connected to the processor and having stored therein instructions that, when executed by the processor, cause the processor to:
configure a bandwidth limitation parameter for each CSG of the CSGs, wherein the bandwidth limitation parameter for each CSG is configured by the RSG for a group queue (GQ) that is connected to the CSG, and wherein the multiple base stations connected to the CSG form the GQ;
create different authentication, authorization and accounting (AAA) domains for different Internet Protocol (IP) address network segments, and configure a first QoS scheduling parameter in each AAA domain; and
determine a bandwidth limitation parameter of a CSG connected to a first base station according to the bandwidth limitation parameter configured for each of the CSGs, according to the QoS scheduling parameter configured in each AAA domain, and according to a configuration parameter of a first base station, and determine a second QoS scheduling parameter of the first base station;
wherein the configuration parameter is used to indicate the CSG connected to the first base station, and is used to indicate an AAA domain corresponding to the first base station; and
wherein the first base station is one of the multiple base stations that initiate service requests.

12. The system according to claim 11, wherein the RSG and the CSGs are connected through subinterfaces or physical interfaces; and
wherein the instructions causing the processor to configure the bandwidth limitation parameter for each CSG of the CSGs comprise instructions that, when executed by the processor, cause the processor to:
create a group queue (GQ) template for each of the CSGs;
configure the bandwidth limitation parameter for a corresponding CSG in the GQ template; and
bind the GQ template to a subinterface or a physical interface of the corresponding CSG.

13. The system according to claim 11, wherein the instructions causing the processor to create different AAA domains for different IP address network segments, and configure the first QoS scheduling parameter in each AAA domain comprise instructions that, when executed by the processor, cause the processor to:
acquire IP address network segments to which the multiple base stations belong;
create the corresponding AAA domains for the different IP address network segments; and
configure, in each AAA domain, the second QoS scheduling parameter for a base station in an IP address network segment corresponding to the AAA domain.

14. The system according to claim 11, wherein the instructions causing the processor to determine a bandwidth limitation parameter of a CSG connected to the first base station and determine the second QoS scheduling parameter of the first base station comprise instructions that, when executed by the processor, cause the processor to:
intercept a request packet sent by the first base station to a Dynamic Host Configuration Protocol (DHCP) server, and extract the configuration parameter of the first base station from the request packet, wherein the configuration parameter comprises an equipment identifier of the CSG connected to the first base station, and an IP address and an Option60 attribute of the first base station;

intercept a reply packet returned by the DHCP server to the first base station, and determine whether an IP address carried in the reply packet matches the IP address of the first base station; and when the IP address carried in the reply packet matches the IP address of the first base station, determine, according to the equipment identifier, the bandwidth limitation parameter of the CSG connected to the first base station, and determine, according to an AAA domain specified in the Option60 attribute, the second QoS scheduling parameter of the first base station.

15. The system according to claim 14, wherein the equipment identifier comprises an identifier of an interface between the CSG connected to the first base station and the RSG.

16. The method of claim 1, wherein the RSG is disposed between the CSGs and a Dynamic Host Configuration Protocol (DHCP) server, and relays messages between the CSGs and the DHCP server.

17. The RSG of claim 6, wherein the instructions further cause the processor to relay messages between the CSG and a Dynamic Host Configuration Protocol (DHCP) server.

18. The system of claim 11, wherein the RSG is disposed between the CSGs and a Dynamic Host Configuration Protocol (DHCP) server, wherein the instructions further cause the processor to relay messages between the CSGs and the DHCP server.

* * * * *